United States Patent [19]
Smith

[11] 3,998,983
[45] Dec. 21, 1976

[54] RESIN RICH EPOXIDE-MICA FLEXIBLE HIGH VOLTAGE INSULATION

[75] Inventor: James D. B. Smith, Turtle Creek, Pa.

[73] Assignee: Westinghouse Electric Corporation, Pittsburgh, Pa.

[22] Filed: June 27, 1975

[21] Appl. No.: 591,244

[52] U.S. Cl. .................. 427/374 R; 427/386; 428/241; 428/324; 428/363; 428/413; 428/454

[51] Int. Cl.² ................ B05D 3/02; B32B 19/04; B32B 27/38

[58] Field of Search .......... 428/324, 241, 413, 454, 428/363; 427/386, 374

[56] References Cited
UNITED STATES PATENTS

| | | | |
|---|---|---|---|
| 3,458,389 | 7/1969 | Mertens | 427/386 X |
| 3,556,925 | 1/1971 | Mertens | 428/324 X |
| 3,563,850 | 2/1971 | Stackhouse et al. | 427/386 X |
| 3,592,711 | 7/1971 | De Senarclens et al. | 428/324 X |
| 3,647,611 | 3/1972 | Mertens | 428/324 |
| 3,660,220 | 5/1972 | Groff | 428/413 X |
| 3,841,959 | 10/1974 | Mertens | 428/324 X |

Primary Examiner—Harris A. Pitlick
Attorney, Agent, or Firm—D. P. Cillo

[57] ABSTRACT

A flexible mica sheet is made by: (A) mixing solid and liquid epoxide resin in a dual solvent system, (B) adding an organo-titanate catalyst, and mixing to form a homogeneous admixture, (C) applying the admixture to a sheet material comprising mica, so that organo-titanate contacts the mica, causing organo-titanate to act as a latent catalyst, and (D) removing solvent, to form a flexible B staged epoxide resin containing an amount of organo-titanate effective to cure the epoxide in the sheet material heating.

8 Claims, 2 Drawing Figures

RESIN RICH EPOXIDE-MICA FLEXIBLE HIGH VOLTAGE INSULATION

BACKGROUND OF THE INVENTION

Titanium alkoxides are characterized in U.S. Pat. No. 3,379,654, and the Kirk-Othmer Encyclopedia of Chemical Technology, Vol. 20, pp. 491–493, as crosslinking agents for epoxide resins. They form 'titanated', soluble, curable epoxide prepolymers for fibrous laminates, which can be further hardened with amines, amides, Friedel-Crafts catalysts, and polycarboxylic acid/anhydrides. In U.S. Pat. No. 2,742,448; 2,962,410; 3,123,582 and 3,385,835; alkyltitanates were used as combination moderating and curing agents with amine curing or complexing agents, and as curing accelerators with polycarboxylic acid-anhydrides, for epoxide resins used as pre-impregnated insulation lay-ups, metal coating compositions, varnishes, casting resins, molding compositions and adhesives. None of the organo-titanates were used in combination with mica to form a latent-catalyst for flexible insulation pre-pregs.

In the manufacture of large rotating machines, epoxide resins have long been used as impregnants for insulation which relies upon mica, in the form of paper, flakes or large splittings as the dielectric. In this art, epoxide-polycarboxylic acid/anhydride systems are generally catalyzed with materials such as dicumyl peroxide and tertiary butylperbenzoate, as in U.S. Pat. No. 3,647,611, or with quaternary organic phosphonium compounds, as in U.S. Pat. No. 3,759,866. These catalyzed, epoxide-polycarboxylic acid/anhydride impregnants are then vacuum impregnated into prewound mica tape insulated coils.

Vacuum impregnation, however, is costly and time consuming, but has generally been considered necessary to get a void free insulating tape. Groff, in U.S. Pat. No. 3,660,220, used as a mica-glass cloth tape, pre-impregnated with a toluene-methyl isobutyl ketone solution of an epoxide-hydrogenated castor oil modified acid anhydride, as a pre-preg electrical insulation for motors. These solutions were catalyzed with stannous octoate, tertiary amines or boron trifluoride complexes. These catalysts, however, provide poor high temperature electrical properties, as shown by dissipation (power) factor values of 25% at 155° C. Also, these mica tapes would not retain their initial flexibility after storage.

While the pre-preg tape concept is an improvement in the art, it presents a host of problems with respect to tensile strength, void-free resin impregnation, and retention of flexibility after long periods of storage i.e. over 6 months. What is needed then, is a new mica latent catalyzed resinous insulation tape for high voltage motors and large rotating machines, that is void-free and will retain flexibility after long term storage.

SUMMARY OF THE INVENTION

Briefly, the above problems are solved by contacting sheet insulation containing mica, with a homogeneous, polymerizable, resinous admixture containing a combination liquid plus solid (or semi-solid) epoxide resin system, a combination ketone plus benzene or arene solvent system, and an organo-titanate catalyst. After applying the admixture to the mica sheet, organo-titanate contacts the mica, causing organo-titanate to act as a latent catalyst. The solvents in the composition are then evaporated, at a temperature and for a time effective to remove about 95 to about 99% of the solvent initially present in the tape without curing of the epoxide. This solvent removal provides a non-tacky, flexible, B staged epoxide resin, containing a higher concentration of organo-titanate. During solvent removal additional organo-titanate contacts the mica in the sheet material, causing more organo-titanate to act as a latent catalyst.

This method provides, high voltage capability mica insulation that is resin saturated, flexible, and tackfree at 25° C for over 6 months. The compositions will allow solvent flash off without resin cure, and upon cure, the mica insulation will provide power factor values of below 12% at 150° C. The impregnated mica insulation possesses good solvent and chemical resistance properties, and excellent tensile strength, allowing it to be used on commercial coil taping machines.

BRIEF DESCRIPTION OF THE DRAWINGS

For a better understanding of the invention, reference may be made to the preferred embodiments, exemplary of the invention, shown in the accompanying drawings in which.

DESCRIPTION OF THE PREFERRED EMBODIMENTS

Figure 1:
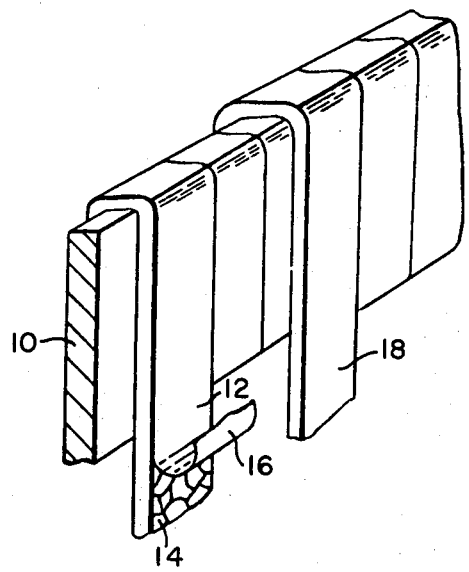
FIG. 1 is a fragmentary view in perspective, showing part of a copper coil wound with the impregnated mica tape of this invention.

One type of epoxide or epoxy resin, which may be used in the invention, is obtainable by reacting epichlorohydrin with a dihydric phenol in an alkaline medium at about 50° C, using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

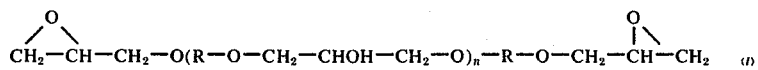

where $n$ is an integer of the series 0, 1, 2, 3 ..., and R represents the divalent hydrocarbon radical of the dihydric phenol. Typically R is:

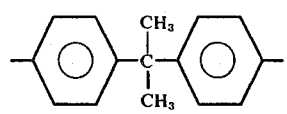

to provide a diglycidyl ether of bisphenol A type epoxide or

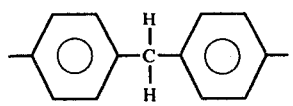

to provide a diglycidyl ether of bisphenol F type epoxide resin.

The bisphenol epoxides used in the invention have a 1, 2 epoxy equivalency greater than one. They will generally be diepoxides. Monoepoxides are not suitable because of poor cured tensile strength. By the epoxy equivalency, reference is made to the average number of 1, 2 epoxy groups,

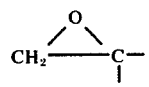

contained in the average molecule of the glycidylether. Typically, epoxy resins of bisphenol are readily available in commercial quantities and reference may be made to the *Handbook of Epoxy Resins*, by Lee and Neville for a complete description of their synthesis.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of which is represented by the chemical structural formula:

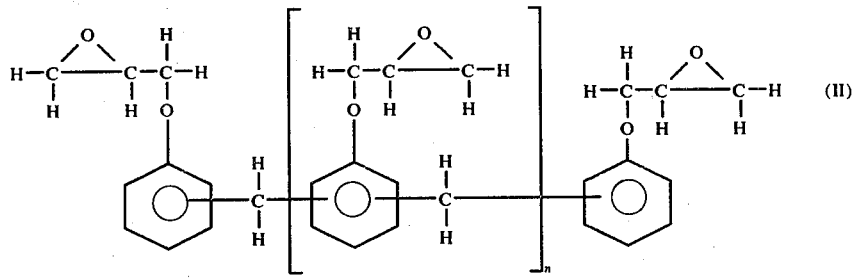

wherein $n$ is an integer of the series 0, 1, 2, 3, etc.

Although epoxy novolac resins from formaldehyde are generally preferred for use in this invention, epoxy novolac resins from any other aldehyde such as, for example, acetaldehyde, chloraldehyde, butylaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis [p-(2,3-epoxypropoxy)-phenyl]-methane. These resins are well known in the art and reference may be made to the *Handbook of Epoxy Resins* for a complete description of their synthesis.

Other useful epoxides include cycloaliphatic epoxides and glycidyl esters. The cycloaliphatic type epoxides employed as the resin ingredient in the invention are selected from non-glycidyl ether epoxides containing more than one 1,2 epoxy group per molecule. These are generally perpared by epoxidizing unsaturated aromatic hydrocarbon compounds, such as cycloolefins, using hydrogen peroxide or peracids such as peracetic acid and perbenzoic acid. The organic peracids are generally prepared by reacting hydrogen peroxide with either carboxylic acids, chlorides or ketones to give the compound R-COOOH. These resins are well known in the art and reference may be made to Brydson, J., *Plastic Materials*, 1966, 471, for their synthesis and description.

Such non-glycidyl ether cycloaliphatic epoxides are here characterized by the absence of the ether oxygen bond, i.e. —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides.

Examples of non-glycidyl ether cycloaliphatic epoxides would include 3,4-epoxycyclohexylmethyl-3,4-epoxy cyclohexane carboxylate (containing two epoxide groups which are part of ring structures, and an ester linkage); vinyl cyclohexene dioxide (containing two epoxide groups, one of which is part of a ring structure); 3,4-epoxy-6- methylcyclohexyl methyl-3,4-epoxy-6-methyl-cyclohexane carboxylate and dicyclopentadiene dioxide, having the following respective structures:

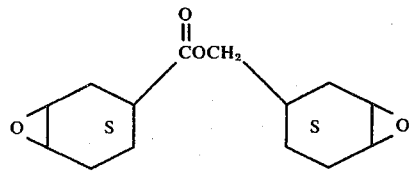

-continued

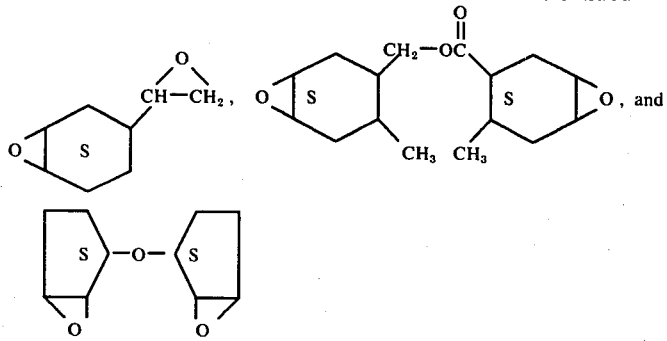

A distinguishing feature of many of the nonglycidyl ether cycloaliphatic epoxides is the location of the epoxy group(s) on a ring structure rather than on an aliphatic side chain. Generally, the cycloaliphatic epoxide particularly useful in this invention will have the chemical structural formula selected from the group of:

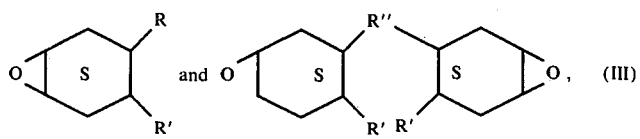

where S stands for a saturated ring structure, R is selected from the group consisting of $CHOCH_2$, $O(CH_2)_n$-$CHOCH_2$ and $OC(CH_3)_2CHOCH_2$ radicals where $n = 1$ to 5, R' is selected from the group consisting of hydrogen, methyl, ethyl, propyl, butyl and benzyl radicals and R'' is selected from the group consisting of $CH_2OOC$, and $CH_2OOC(CH_2)_4COO$ radicals.

Other types of epoxides useful in this invention are epoxide resins derived from acid groups in an epichlorohydrin reaction. These are the glycidyl esters. Generally they involve reaction of epichlorohydrin with a mono or poly carboxylic acid or the sodium or potassium salt of the acid. An alternative procedure is to react glycidyl with acid chlorides. Most commonly, the carboxyl group is reacted directly in the presence of some catalyst other than sodium hydroxide, dehydrohalogenation being accomplished after completion of the initial reaction. These glycidyl ester resins are well known in the art and reference may be made to the *Handbook of Epoxy Resins*, pp. 2–18, for their synthesis and complete description.

The particular glycidyl esters employed as the resin ingredient in the invention are non-glycidyl ether epoxides containing more than one 1,2 epoxy group per molecule. They are characterized by substitution of the ester bond

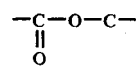

for the ether bond —O— and have the chemical structural formula:

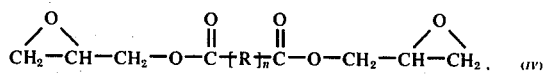

where R is an organic radical substituent selected from the group consisting of R', R'—O—R', R'—COO—R' and mixtures thereof, where R' is selected from the group consisting of alkylene groups, having from about 1–8 carbon atoms, saturated cycloalkylene groups where the ring has 4 to 7 carbons and mixtures thereof, where $n$ is from about 1–8.

All of these epoxide resins can be characterized by reference to their epoxy equivalent weight, which is defined as the mean molecular weight of the particular resin divided by the mean number of epoxy radicals per molecule. In the present invention, the suitable solid bisphenol A and bisphenol F epoxides will have a preferred epoxy equivalent weight of from about 350 to 1500; the suitable liquid bisphenol A and bisphenol F epoxides will have a preferred epoxy equivalent weight of from about 150 to 250; the suitable epoxy-novolac resins are solids and will have a preferred epoxy equivalent weight of from about 100 to 500; the suitable solid cycloaliphatic epoxides will have a preferred epoxy equivalent weight of from about 350 to 1000; the suitable liquid cycloaliphatic epoxides will have a preferred epoxy equivalent weight of from about 50 to 400; the suitable solid glycidyl ester epoxides will have a preferred epoxy equivalent weight of from about 250 to 1000; and the suitable liquid glycidyl ester epoxides will have a preferred epoxy equivalent weight of from about 150 to 350.

The epoxide system must be a mixture of liquid epoxide with either solid or semi-solid epoxide. An all solid epoxide or an all semi-solid epoxide will not provide a flexible mica insulating tape, and an all liquid epoxide will not provide a non-tacky mica insulating tape. The preferred weight ratio of solid (or semi-solid) epoxide: liquid epoxide is from about 60:40 to 95:5.

The epoxide resin system must be mixed with a dual solvent system. The dual solvent system consists of a mixture of a ketone, plus an aromatic hydrocarbon co-solvent selected from the group of benzene and arene and their mixtures. The ketone will have from 3 to 6 total carbon atoms in the molecule. Particularly useful ketones are acetone, methyl ethyl ketone and methyl isobutyl ketone. The arene is selected from the group of toluene, ethylbenzene, xylene and their mixtures. Without the benzene or arene component, the epoxide will be difficult to get into solution and the epoxide in the mica tape will blister upon solvent flash off causing void formation. Without the ketone component, the mica particles will exhibit poor wetting characteristics with resulting poor resin penetration causing voids, and poor mica organo-titanate contact.

Ketones or arenes having higher molecular weights than those described above will present problems of solvent flash off without catalyzing the resin system, i.e., solvent removal would require temperatures of about 175° C, which would activate the catalyst and begin resin polymerization. The preferred weight ratio of ketone: benzene and/or arene is from about 70:30 to 30:70. This range provides the best solubility for all components, optimum volatility characteristics for solvent flash off, good wetting and resin saturation of the mica in the insulating tape.

The solvent content of the impregnant solution of polymerizable resin must be within a weight ratio of total epoxides: total dual solvent of from about 85:15 to 30:70 i.e., solvent content between about 15 to 70% by weight of the epoxide-solvent mixture based on total solvent plus total weight of solid and liquid epoxide. Above 70% solvent, not enough epoxide will be impregnated into the mica, causing void formation. Under 15% solvent and the composition will be too viscous and will result in poor impregnant penetration, uneven resin distribution through the mica and poor mica organo-titanate contact. The viscosity of the impregnant solution of polymerizable resin must be between about 25 to 200 cp., but preferably between about 40 to 100 cp. at 25° C. By operating within this range, complete resin saturation of the tape is assured i.e., about 20 to 40 weight percent of the tape will be epoxide, based on the weight of epoxide, backing and mica.

The catalyst is an organo-titanate Ti(OR)$_4$ of the general structural chemical formula:

$$\begin{array}{c} \text{OR} \\ | \\ \text{OR}-\text{Ti}-\text{OR} \\ | \\ \text{OR} \end{array}$$

where each R group is independently selected from the group consisting of: alkyl groups having from about 1–10 carbon atoms; aryl groups, such as phenyl i.e.

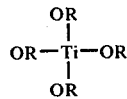

naphthyl i.e.

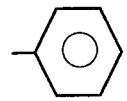

Cl, Br or NO$_2$ substituted aryl groups, such as

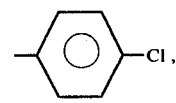

where the substituents selected from Cl, Br and NO$_2$ are substituted for hydrogens on the cyclic structure; aralkyl groups, such as

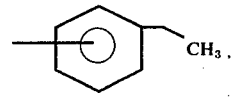

where the alkyl constituent has from about 1–10 carbon atoms; alkaryl groups, such as benzyl i.e.

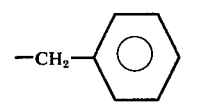

with the alkyl constituent having from about 1–10 carbon atoms; Cl, Br or NO$_2$ substituted alkaryl groups, such as

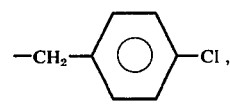

where the substituents selected from Cl, Br and NO$_2$ are substituted for hydrogens on the cyclic structure, with the alkyl constituent having from about 1–10 carbon atoms; cycloalkyl (alkylene) groups selected from cyclopentane groups, cyclopentene groups, cyclopentadiene groups, cyclohexane groups, cyclohexene groups, and cyclohexadiene groups. Over 10 carbons in an alkyl group leads to insolubility in the epoxy resin.

The catalyst must be completely soluble in the composition so that it does not separate from the solution and leave portions of the mica tape undercured after final baking. In this regard the solvent system described above is critical. It is essential that the organo-titanate compounds be added, as a last step to the dual solvent solution of epoxide resin, otherwise solubility and separation as well as gelling problems can occur. If the organo-titanate is added directly to the epoxide resins, instantaneous partial gel can occur. If they are added at temperatures over about 35° C, partial gell can also occur.

Examples of suitable organo-titanates include tetrabutyl titanate, tetra-2-ethylhexyl titanate, tetrabenzyl titanate, tetranaphthyl titanate, tetraphenyl titanate, tetra-2-benzylphenyl titanate, tetrachlorophenyl titanate, tetra-chlorobenzyl titanate, tetracyclopentane titanate, etc. The preferred catalysts are alkyl titanates, particularly tetrabutyl titanate (TBT) and tetra-2-ethylhexyl titanate, because they are readily available and are highly soluble in the resin dual solvent solution.

The catalyst of this invention, when it contacts the mica, acts as a latent catalyst i.e., one which will not start to polymerize the resin at temperatures of up to

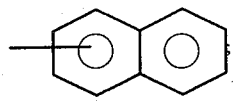

about 40° C, but will cure it quickly at elevated resin temperatures, of about 140° C and above even when used in small quantities. A latent catalyst effect is required because the impregnated mica tape must be subjected to an evaporative solvent removal step, for a short period of time at tape and resin temperatures of between about 65° C to 125° C, without substantial epoxide resin cure. If a sufficient amount of the dispersed organo-titanate does not saturate between the mica particles and layers, a latent catalyst effect will not be initiated and the epoxide will start to gel at temperatures over about 25° C.

It is essential that no anhydride, amine, phenol or amide curing agent be used in this system, otherwise the composition will start to cure during solvent flash off, shortening the storage life of the insulation. Use of the organo-titanates described above allows complete substitution for the usual amine or polycarboxylic acid-/anhydride curing agent, with a substantial cost reduction, and improved electrical and storage properties.

The organo-titanates, after impregnation and contact with the mica, do not substantially initiate gellation of the epoxide resin during the period of solvent flash off, which should last no longer than 10 minutes at tape and resin temperatures no higher than about 125° C. After solvent flash off, the epoxide is in a fusible, solid but not cured, B staged condition i.e., dry to the touch, non-tacky, containing up to about 5 weight % solvent, i.e. about 95 to 99 weight % solids, and capable of fusion upon heating, to form a fully cured infusible material.

It is believed that a large portion of the organo-titanates uniformly distributed through and substantially unreacted with the epoxide mixture, form an effectively stable and latent complex with contacting mica which curbs the epoxide polymerization until resin temperatures of about 140° C are reached. At about 140° C, the breakdown or disassociation of these complexes give rise to reactive species which are able to quickly promote polymerization of the epoxy groups.

While applicant does not wish to be held to any particular theory, applicant believes that a substantial portion of the organo-titanate, between about 40 to 90 weight percent of that present on the admixture depending on mica type and particle size, complexes with contacting mica before or during the solvent flash evaporation step. It is thought that about one-half of the organo-titanate that will form a latent catalyst with the mica will do so upon impregnation, while the rest will complex during solvent removal, as the concentration and so intimate contact of the organo-titanate increases. Chemically, natural micas are complex silicates of aluminum with potassium, magnesium, iron, sodium, lithium and traces of other elements. The mica most frequently used in insulation are the Muscovite $H_2KAl_3(SiO_4)_3$ and Phlogopite $H_2KM_3Al(SiO_4)_3$ types.

It seems possible that the organo-titanates which are near or drawn to the alkali aluminum silicate will form complexes or adducts at the basic sites of the mica structure. With Muscovite, the most commonly used mica dielectric, these basic sites are most likely to be found at the

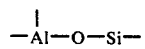

covalent linkage. Thus, bonding between an organo-titanate, such as tetrabutyl titanate and Muscovite mica could take place as shown:

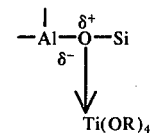

Here the electron donating atom is oxygen and $\delta-$ and $\delta+$ signify the likely polarization between the two elements. These structures are not established or fully understood and are not to be taken as limiting, but are set out as a possible explanation of the observed facts. These adducts would be formed at temperatures up to about 140° C and dissociated by heating over about 140° C. Without the mica present to chemically interact and form latent catalyst complexes with the organo-titanates, the epoxide resin will not have a prolonged storage life i.e. the resin will become stiff after about 5–7 days at room temperature. Also other materials than mica, for example cellulose paper, linen, polyester, cotton, nylon and polyethylene do not appear to form these complexes with the organo-titanate.

These particular organo-titanates were found to be very safe, non-exothermic catalysts. They allow storage of the impregnated mica insulation for 6 to 12 months or longer at 25° C without appreciable loss of flexibility or increase in stiffness. They can polymerize the epoxide resin in the mica tape without a significant temperature rise during cure. The covalent bonding of these organo-titanate compounds, assures that no ionic fragments are imparted by them to the cured mica insulation which would deleteriously affect electrical properties.

The amount of organo-titanate used must be soluble in the epoxide-solvent system, yet be effective to cure the impregnated mica sheet during the final cure-heating step after solvent flash off. The amount of organo-titanate used also depends upon the combination of epoxides used. For bisphenol epoxides and epoxy novolac resins and their mixtures, about 1 to 15 parts of organo-titanate can be used per 100 parts of diglycidyl ether of bisphenol A, bisphenol F, or epoxy novolac resin (solid + liquid), preferably 5 to 10 parts per 100 parts of total resin. For cycloaliphatic epoxides and glycidyl ester epoxides and their mixtures, about 0.01 to 1 part of organo-titanate can be used per 100 parts of resin (solid + liquid) preferably 0.25 to 0.75 part per 100 parts of total resin. When a combination bisphenol or novolac with cycloaliphatic or glycidyl ester resin system is used, about 1 to 5 parts of organo-titanate can be used per 100 parts of resin (solid + liquid), preferably about 1.5 to 3 parts per 100 parts of resin i.e., for example, if a solid epoxy novolac is used with a liquid glycidyl ester epoxide or a solid glycidyl ester epoxide with a liquid bisphenol epoxide; about 1 to 5 parts of organo-titanate can be used.

Use of more than the above specified broad range amounts of organo-titanate will provide too much catalyst in the mixture and will cause poor shelf-life in the impregnated mica insulation. Use of less than the above specified broad range amounts of organo-titanate will not provide enough catalyst to effectively polymerize the epoxide, causing poor gell times and sluggish curing of the epoxide resin in the mica insulation.

In the method of this invention: (1) the solid epoxide is mixed with the liquid epoxide and dual solvent system and then, (2) the organo-titanate catalyst is added slowly with stirring to the epoxide solution at temperatures of up to about 35° C, to form a homogeneous admixture, (3) the epoxide solution admixture is applied to an insulation substrate, which will contain mica sheet in the form of paper, integrate flake paper, flakes, or large splittings, by any suitable means such as by brushing, dipping, spraying, etc., (4) the mica sheet insulation containing the contacting applied solution is heated at a temperature and for a time, generally about 1 to 10 minutes at a mica sheet and resin temperature of between about 65° to 125° C i.e. an oven temperature of between about 85° to 150° C, effective to drive off or flash off substantially all of the solvent. At least about 95 weight percent of the solvent present in the solution must be evaporated to form a B staged epoxide of about 95 to 99 percent solids at this point, so that there is minimal solvent removal upon final curing of the insulation.

A sufficient amount of mica-organo-titanate chemical interaction by complexing is believed to take place in step (3) and (4), allowing solvent flash off without complete cure at tape temperatures of up to about 125° C. In step (4), while the oven temperature may be about 150° C, the mica tape and resin temperatures are about 125° C maximum, because of the cooling effect of solvent evaporation, and because of mica insulation is only in the oven for a short period of time.

Finally, the insulation is cooled to room temperature, at which time it is flexible, tack-free and can be wound onto a takeup reel without blocking or sticking, and stored for up to 1 year without losing flexibility and tack-free properties. It can then be applied, either by hand or using commercial coil wrapping machines, to coils and other metallic electrical conductors as a curable pre-preg which does not require vacuum resin impregnation. After flash off, the epoxide is a fusible, dry, non-cured solid in the non-tacky B stage condition, containing up to about 5 weight percent solvent residue, based on epoxide, mica, solvent, catalyst weight. The epoxide in the mica sheet is capable of being fully cured, generally at a resin temperature of at least 140° C, for 2 to 24 hours, to remove the solvent residue and to form an infusible resin, by complete catalytic polymerization with the organo-titanate. During cure the mica and resin temperatures shortly reach the oven or press temperatures.

Referring to FIG. 1 of the drawings, coil 10, shown as a single conductor strap of copper or aluminum for instance, is wrapped with an overlapping layer of latent catalyzed epoxide resin impregnated mica tape 12. The tape 12 comprises a micaceous layer such as mica paper, large mica splittings, mica flakes, or preferably, integrated flake paper 14 and generally a supporting sheet backing 16. The tape may be applied half-lapped, butted or otherwise. One or more additional layers 18 of mica tape, similar to tape 12 may be applied over tape 12. To impart better abrasion resistance and to secure a tighter insulation an outer wrapping of tape of a tough fibrous material, such as glass fiber or the like may be applied to the coil.

The mica tape for insulating coils in accordance with the present invention may be prepared from a sheet backing support material upon which is disposed a layer of mica in the form of integrated flake paper, flakes, splittings or very fine particle size mica paper. The sheet backing and the mica are contacted with liquid resinous impregnant. No epoxide binder is needed to hold the mica and backing together. This mica insulation is preferably in the form of a tape of the order of ½ inch to 2 inches in width, though sheet insulation of any other width may be prepared. In a continuous operation, the epoxide solution can be applied to the mica material on a continuous belt which contacts the mica material with moving support material, and causes an adhesive bond between the mica and support, followed by solvent flash off by passage through a heating means.

For building electrical machines, the sheet backing for the mica may comprise cellulose paper, cotton or linen fabrics, asbestos paper, woven glass cloth or glass fibers, sheets or fabrics prepared from synthetic resins such as nylon, polyethylene and linear polyethylene terephthalate resins or additional mica paper sheets. Sheet backing material of a thickness of approximately 1 mil (0.001 in or 0.0025 cm), to which there has been applied a layer of from 3 to 10 mils thickness of mica has been successfully employed.

Mica flakes are generally about 1/16 to ¾ inch square while mica splittings are generally about ¾ inch to 3 inches square. Integrated mica flake paper is of compacted mica particles about one thirty-second inch to one-half inch square and fine mica paper is made of compacted mica particles about 1/64 inch to 1/16 inch square. Generally, the finer the mica particles the more interaction with the organo-titanate.

The mica tape is impregnated with the liquid, completely reactive polymerizable resinous compositions of this invention so that there is complete saturation between mica layers. After impregnation the solvent is flashed off and the pre-preg tape is stored or wrapped around the coil or other conductor. The insulated coil, after wrapping, is then exposed to the application of heat and pressure, to provide a thermally stable, tough, cured insulation. No vacuum impregnation step is needed.

Coils insulated with the impregnated mica wrapping of this invention are placed in a hot press in which the slot portions are subjected to heat and pressure for a period of time to cure the resinous composition in the slot portions. The end portions of the windings will be substantially uncured. This hot pressing operation produces a coil having a slot portion of the exact size required for the electrical machine and can be fitted into the slots of the electrical machine readily with flexing of the end portions.

Figure 2:
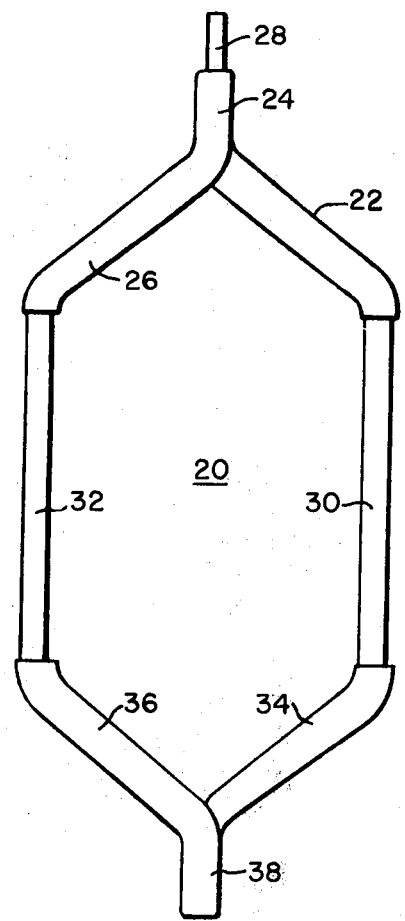
FIG. 2 is a plan view of a closed electrical coil member having two slot portions.

One type of a closed full coil 20 which may be prepared in accordance with the present invention is illustrated in FIG. 2. The full coil comprises an end portion comprising a tangent 22, a connecting loop 24 and another tangent 26 with bare leads 28 extending therefrom. Straight slot portion 30 and 32 of the coil which have been hot pressed to cure the resin and to form them to predetermined shape and size, are connected to the tangents 22 and 26, respectively. These slot portions are connected to other tangents 34 and 36 connected through another loop 38.

The complete full coils prepared as disclosed herein, with cured slot portions and uncured end portions are placed within the slots of the stator or rotor of an electrical machine and the end windings wrapped and tied together. The uninsulated leads are then soldered, welded or otherwise connected to each other or to the commutator. Thereafter, the entire machine will be placed in an oven and heated to a temperature to cure the completely reactive composition applied to the end portions.

The following non-limiting Examples 1–3 are illustrative of various resin formulations and insulating composites of this invention.

EXAMPLE 1

A resin formulation was made containing a room temperature admixture of 75 grams of a solid cycloaliphatic non-glycidyl ether epoxide of the substituted cyclohexene type, having an epoxy equivalent weight of about 370–425 and a softening point of 85°–113° C (sold commercially by Union Carbide under the tradename ERRA-4211), 25 grams of 3,4-epoxy cyclohexylmethyl-3,4-epoxy cyclohexane carboxylate, a liquid cycloaliphatic non-glycidyl ether epoxide having an epoxy equivalent weight of about 133 and a viscosity at 25° C of 350–450 cp. (sold commercially by Union Carbide under the tradename ERL-4221), 50 grams of methyl ethyl ketone solvent and 50 grams of toluene solvent. This provided a weight ratio of solid epoxide: liquid epoxide of 75:25; a ratio of ketone: arene of 50:50; and a solvent content of 50% based on the weight of total epoxide resin i.e. 100 grams solvent to 100 grams total epoxide solid and liquid resin.

To this resin formulation 0.5 grams of liquid tetrabutyl titanate as catalyst was slowly added with stirring at about 25° C. This provides 0.5 parts of organo-titanate per 100 parts of total resin (solid + liquid). All the components were dissolved and the composition was homogeneous. It is important to add the organo-titanate to the epoxide-solvent system, otherwise the organo-titanate will separate, and the impregnating composition will not be homogeneous. The viscosity of the impregnating composition was about 50 to 60 cp at 25° C.

Using 108 type-glass woven fabric as backing material; 4 × 4 inch glass strips were bonded to integrated flake mica paper by brushing the above described resinous, homogeneous impregnating composition onto the mica, through the glass fabric. The composition appeared to easily wet the mica and uniformly distribute between the mica particles and layers, impregnating without formation of any voids. The mica was in the form of integrated mica flake paper about 0.005 inch thick and composed of compacted flakes between about one-sixteenth to one-half inch square.

The solvents were then substantially removed i.e., about 98% of their initial amount, by placing the impregnated mica strips in a forced air oven for 6 minutes at an oven temperature of 150° C. The actual temperature of the mica sheet strips and resin would be close to 100° C, since the solvent evaporation cools the strips. The epoxide-organo-titanate-mica-glass samples contained about 30 weight % catalyzed epoxide resin plus solvent residue as determined by initial weight and final weight measurement after flash off.

After solvent flash off, the pre-preg strips were found to be blister-free, flexible, i.e., the strips could be wound around a ½ inch mandrel without creasing or cracking, and tack-free, i.e., the strips could be placed on each other without sticking or blocking. The epoxide was only B staged and not completely cured. The organo-titanate apparently interacted with the mica to provide a latent catalyst effect, so that the epoxide did not completely cure. Other samples of the composition not impregnated into mica sheet, but left in the container, started to gel at 25° C, and when put in an oven completely cured at an oven temperature of about 150° C.

Composites were then made with these mica strips for power factor (100 tan δ) and dielectric constant ($\epsilon'$) measurements (ASTM designation D150-65T). This was done by stacking 4 pieces of impregnated mica strip on top of each other and curing them between metal plates in a press for 16 hours at 150° C and 0.50 lb./sq.in. to form a composite. Here, the temperature of the strips and resin would be 150° C after about 15 minutes. The resulting laminated composite thickness was about 0.026 to 0.028 inch. Breakdown voltages were measured on the composites at 25° C under hydrocarbon oil, using a voltage rise of 1 KV/sec. The results are shown in Table 1:

TABLE 1

| SAMPLE | Electrical Properties at 150° C and 60 Hz. | | Breakdown Voltage at 25° C |
|---|---|---|---|
| | Power Factor (100×tan δ) | Dielectric Constant | |
| (s) & (1) cycloaliphatic + 0.5 phr TBT | 4.0% | 3.6 | 538 volts/mil |

Power Factor values below about 10.0% at 150° C and Breakdown Voltage values above 200 volts/mil are considered excellent for 25 to 30 mil integrated mica flake-cured resin composites for high voltage insulation applications.

Using 108-glass fabric as backing material, ¾ inch wide mica tape and 12 inch wide mica wrapper insulation was prepared, using the same impregnant and method described above. The wrapper was used as three-layer insulation on the straight slot portions of two hand wrapped 2,300 volt coils for small motors. The tape was used as three-layer insulation on the tangent ends of the coils. Experimental data provided average power factor values at 150° C (100 × tan δ) of 3.9% and 5.3% when the applied voltage was 2,000 volts and 3.5% and 4.8% when the applied voltage was 1,500 volts; where values below 20% are considered excellent for impregnated mica flake backed insulation on low voltage coils under voltage stress. Of particular commercial importance is the fact that the usual vacuum impregnation step was eliminated with superb results by using the pre-preg. It is essential, however, that the solvent flash off step remove at least 95% of the solvent.

Portions of the latent catalyzed epoxide impregnated insulating tape were stored at 25° C for 1 year without losing noticeable flexibility, and could still be used after that time period for winding coils. Tensile strength of the pre-preg tapes was found to be adequate for automatic commercial coil wrapping machines. This same impregnant when impregnated into cotton fabric with no mica, cured and became stiff after solvent flash off for 6 minutes at an oven temperature of 150° C.

Other ketone-benzene or arene combinations, as previously described, would provide an effective solvent system; likewise, other organo-titanate catalysts such as for example those containing aryl, alkaryl, araklyl would be effective catalysts, these ingredients being added similarly as their counterparts above.

EXAMPLE 2

A resin formulation was made containing a room temperature admixture of 75 grams of a solid glycidyl ester resin having a structure similar to formula (IV) above, where R' is a saturated cycloalkylene group having 6 carbons, having an epoxy equivalent weight of about 440 and a melting point of 95° C, 25 grams of a liquid glycidyl ester resin having a structural formula similar to the solid glycidyl ester but having an epoxy equivalent weight of about 152 and a viscosity at 25° C of 230 cp. (both sold commercially by Celanese under the respective tradenames GLY-CEL C-295 and GLY-CEL C-200), 50 grams of methyl ethyl ketone solvent and 50 grams of toluene solvent. This provided a weight ratio of solid epoxide: Liquid epoxide of 75:25; a ratio of ketone: arene of 50:50; and a solvent content of 50%.

To this resin formulation 0.50 gram of liquid tetrabutyl titanate as catalyst was slowly added with stirring, at about 25° C. This provided 0.50 part of organo-titanate per 100 parts of total resin. The viscosity of the impregnating composition was about 50 to 60 cp at 25° C. All the components were dissolved and the composition was homogeneous.

Using the same glass fabric and mica, 4 × 4 inch mica strips were made and solvent removed as in EXAMPLE 1. The composition appeared to easily wet the mica and uniformly distribute without formation of any voids. The strips contained about 29 weight % catalyzed epoxide resin plus solvent residues. After solvent flash off, the pre-preg strips were found to be blister-free, flexible and tack-free. Samples of these latent catalyzed epoxide impregnated insulating strips were stored at 25° C for 1 year without losing noticeable flexibility.

Composites were then made using four pieces of each sample, using the method and curing-pressure cycle described in EXAMPLE 1, to provide 0.026 inch thick composites. Results of electrical measurements are shown below in Table 2.

TABLE 2

| SAMPLE | Electrical Properties at 150° C and 60 Hz. | | Breakdown Voltage at 25° C |
|---|---|---|---|
| | Power Factor (100×tan δ) | Dielectric Constant | |
| (s) & (1) glycidyl ester +0.5 phr TBT | 5.5% | 3.5 | 458 volts/mil. |

EXAMPLE 3

Four resin formulations were made: samples (A) and (B) contained a room temperature admixture of 80 grams of a solid diglycidyl ether of bisphenol A, having an epoxy equivalent weight of about 360–400 and a melting point of 45°–55° C (sold commercially be Celanese under the tradename EPI-REZ 5162), 20 grams of a liquid diglycidyl ether of bisphenol F, having an epoxy equivalent weight of about 165 and a viscosity at 25° C of 3,400 cp. (sold commercially by Dow Chemical Co. under the tradename XD-7818), 50 grams of methyl ethyl ketone solvent and 50 grams of toluene solvent. This provided a weight ratio of solid epoxide: liquid epoxide of 80:20; a ratio of ketone: arene of 50:50; and a solvent content of 50%.

Samples (C) and (D) contained a room temperature mixture of 80 grams solid epoxide EPI-REZ 5162, 20 grams of a liquid diglycidyl ether of bisphenol A having an epoxy equivalent weight of about 172 to 176 and a viscosity at 25° C of between 4000 and 5500 cp; (sold commercially by Dow Chemical Co. under the tradename DER 332), 50 grams of methyl ethyl ketone solvent and 50 grams of toluene solvent. This provided a weight ratio of solid spoxide: liquid epoxide of 80:20; a ratio of ketone:arene of 50:50; and a solvent content of 50%.

To resin sample (A) was added 2 grams of liquid tetrabutyl titanate as catalyst; to sample (B) was added 5 grams of liquid tetrabutyl titanate as catalyst; to sample (C) was added 5 grams of liquid tetrabutyl titanate as catalyst and to sample (D) was added 10 grams of liquid tetrabutyl titanate as catalyst. This provided 2 parts, 5 parts, 5 parts and 10 parts of organo-titanate per 100 parts of total resin respectively. The organo-titanate in all cases was added to the resin samples slowly, with stirring at about 25° C. The viscosity of all the impregnating compositions (A) to (D) was about 60 cp at 25° C. All the components were dissolved and the compositions were homogeneous.

Using 108-glass fabric as backing material; 4 × 4 inch strips were bonded to integrated flake mica paper using the impregnating compositions (A) to (D). The application, flash off method and mica materials were the same as those used in EXAMPLE 1. The compositions appeared to easily wet the mica and uniformly distribute without formation of any voids. The samples contained about 30 weight % catalyzed epoxide resin plus solvent residue. After solvent flash off, the pre-preg strips were found to be blister-free, flexible and tack-free. Samples of all of these pre-pregs were stored at 25° C for 1 year without losing noticeable flexibility.

Composites (A) to (C) were then made using 4 pieces of each sample to make each composite using the method and curing-pressure cycle described in EXAMPLE 1, to provide 0.028 inch thick composites. Results of power factor and dielectric constant measurements are shown in Table 3:

TABLE 3

| SAMPLE | Electrical Properties at 150° C and 60 Hz. | |
|---|---|---|
| | Power Factor (100 × tan δ) | Dielectric Constant |
| (A): (1)&(s) bisphenol + 2phr TBT | 4.2% | 3.03 |
| (B): (1)&(s) bisphenol + 5 phr TBT | 5.1% | 2.84 |
| (C): (1)&(s) bisphenol + 5 phr TBT | 6.3% | 3.03 |

Resin formulations (E) and (F) were made: sample (E) contained a room temperature admixture of 85 grams of a solid polyglycidyl ether of a phenol-formaldehyde novolac having an epoxy equivalent weight of about 160–400 and a melting point of 48°–58° C (sold commercially by Dow Chemical Co. under the tradename DEN 439), 15 grams of liquid bisphenol F epoxide XD-7818, 50 grams of methyl ethyl ketone solvent and 50 grams of toluene solvent. Five grams of liquid tetrabutyl titanate was added slowly with stirring at about 25° C. The viscosity of the impregnating composition was about 60 cp at 25° C. All the components were dissolved and the composition was homogeneous.

Sample (F) contained a room temperature admixture of 70 grams of solid bisphenol A epoxide EPI-REZ 5162, 30 grams of 3,4-epoxy cyclohexylmethyl-3,4-epoxy cyclohexane carboxylate, a liquid cycloaliphatic non-glycidyl ether epoxide having an epoxy equivalent weight of about 133 and a viscosity at 25° C of 350–450 cp. (sold commercially by Union Carbide under the tradename ERL-4211) 50 grams of methyl ethyl ketone solvent and 50 grams of toluene solvent. Two grams of liquid tetrabutyl titanate was added slowly with stirring at about 25° C. The viscosity of the impregnating composition was about 50 to 60 cp at 25° C. All the components were dissolved and the composition was homogeneous.

Using the same glass fabric and integrated flake mica paper, 4 × 4 inch strips were made using the impregnating compositions (E) and (F) and solvent was removed as in EXAMPLE 1. The compositions appeared to easily wet the mica and uniformly distribute without formation of any voids. The strips after flash off contained about 30 weight % catalyzed epoxide resin plus solvent residue based on epoxide, backing and mica. After solvent flash off the pre-preg strips were found to be blister-free, flexible and tack-free. Samples of these pre-pregs were stored at 25° C for over 6 months without losing noticeable flexibility.

Composites (E) and (F) were than made using four pieces of each sample to make each composite, using the method and curing-pressure cycle described in EXAMPLE 1, to provide 0.028 to 0.030 inch thick composites. Results of power factor and breakdown voltage measurements are shown in Table 4:

TABLE 4

| SAMPLE | Power Factor at 150° C and 60 Hz. (100 × tan δ) | Breakdown Voltage at 25° C |
| --- | --- | --- |
| (E): (s) novolac & (1) bisphenol + 5 phr TBT | 12.0% | 464 |
| (F): (s) bisphenol & (1) cycloaliphatic + 2 phr TBT | 5.2% | — |

Lower power factors for the novolac sample could be expected at a higher cure temperature i.e. about 175° C since novolac epoxides tend to require more forcing cure conditions then the other epoxides described.

EXAMPLE 4

As comparative examples, several resin formulations were made and applied to glass cloth backed integrated mica flake paper substrates. The resin system of EXAMPLE 2 was used, containing a room temperature admixture of 75 grams of GLY-CEL C-295 solid glycidyl ester, 25 grams of GLY-CEL C-200 liquid glycidyl ester, and 100 grams of methyl ethyl ketone as the only solvent. To this resin formulation 0.5 grams of liquid tetrabutyl titanate was slowly added with stirring, at about 25° C. The viscosity of the formulation was about 60 cp at 25° C.

Using four-inch square 108-glass fabric backing-mica flake dielectric was impregnated with the formulation. The solvent was removed by flash off for 6 minutes at an oven temperature of 150° C. The mica sample was relatively flexible but the sample showed some blistering of the epoxide resin and hence void formation.

A similar resin system was made, containing a room temperature admixture of 75 grams of GLY-CEL C-295, 25 grams of GLY-CEL C-200, and 100 grams of toluene as the only solvent. To this resin formulation 0.5 gram of liquid tetrabutyl titanate was slowly added with stirring, at about 25° C. The viscosity of the formulation was about 60 cp at 25° C.

Four-inch square 108-glass fabric backing-mica flake dielectric was impregnated with the formulation. The solvent was then removed by flash off for 6 minutes at an oven temperature of 150° C. The wetting characteristics were not found to be satisfactory. This resulted in poor penetration of the mica even for this low viscosity formulation. Dry spots were found on the resulting product due to voids.

These two comparative examples show the necessity and criticality of using the dual solvent system of this invention so that the mica is wetted to allow ease of impregnation, and so the solvent can evaporate without causing epoxide blistering.

A similar resin system was made, containing a room temperature admixture of 75 grams of GLY-CEL C-295, 25 grams of GLY-CEL C-200, 50 grams of methyl ethyl ketone solvent and 50 grams of methylene chloride solvent (not an arene). To this resin formulation 0.25 gram of liquid tetrabutyl titanate was slowly added with stirring, at about 25° C. The viscosity of the formulation was about 60 cp at 25° C.

Four-inch square 108-glass fabric backing-mica flake dielectric was impregnated with the formulation. The solvent was removed by flash off for 6 minutes at an oven temperature of 150° C. The mica sample was relatively flexible but the volatility of the methylene chloride was high enough to prevent good penetration and saturation of the mica. This resulted in dry spots and poor dispersion of the resin through the mica.

A similar resin system was made, containing a room temperature admixture of 75 grams GLY-CEL C-295, 25 grams of GLY-CEL C-200, and 100 grams of n-hexane solvent (not an arene). To this resin formulation 0.25 gram of liquid tetrabutyl titanate was slowly added with stirring at about 25° C. The viscosity of the formulation was about 60 cp at 25° C but some difficulty was experienced dissolving the solid glycidyl ester.

Four-inch square 108-glass fabric backing-mica flake dielectric was impregnated with the formulation. The solvent was removed by flash off for 6 minutes at an oven temperature of 150° C. The mica sample was relatively flexible but the formulation did not properly penetrate and saturate the mica. This resulted in dry spots and poor dispersion of the resin through the mica.

These two comparative examples show that many solvents are not equivalents for either or both of the solvents used in the formulations of this invention.

The system of EXAMPLE 3 was modified, containing a room temperature admixture of 100 grams of EPI-REZ 5162 solid diglycidyl ether of bisphenol A, 50 grams of methyl ethyl ketone solvent, and 50 grams of toluene solvent. To this resin formulation 5 grams of liquid tetrabutyl titanate was slowly added with stirring at about 25° C. The viscosity of the formulation was about 60 cp at 25° C.

Four-inch square 108-glass fabric backing-mica flake dielectric was impregnated with the formulation. The solvent was removed by flash off for 6 minutes at an oven temperature of 150° C. The resulting mica sample was tack-free but very stiff, indicating the need for a solid-liquid epoxide system.

An epoxide-anhydride resin system was made, containing a room temperature admixture of 100 grams of ERRA-4211, a solid cycloaliphatic non-glycidyl ether epoxide of the substituted cyclohexene type, 50 grams of liquid hexahydropthalatic anhydride and 50 grams of liquid 1-methyl tetrahydrophthalic anhydride as combination solvent-curing agents. To this epoxide-anhydride formulation 0.5 gram of liquid tetrabutyl titanate was slowly added at about 25° C. The viscosity of the formulation was about 60 cp at 25° C.

Four-inch square 108-glass fabric backing-integrated mica flake dielectric was impregnated with the formulation. The sample was dried for 6 minutes at an oven temperature of 150° C. The resulting mica sample was tack-free but relatively inflexible. After about 7 days storage at 25° C it was stiff and could not be wrapped around a coil.

An epoxide-amide resin system was made, containing a room temperature admixture of 50 grams of EPI-REZ 5162 solid bisphenol A epoxide, 50 grams of DER 332, liquid bisphenol A epoxide (epoxy equivalent wt = 172–176, viscosity = 4000–5500 cp. sold commercially by Dow Chemical Co.), 50 grams of methyl ethyl ketone solvent, 50 grams of toluene solvent, 5 grams of liquid, tetrabutyl titanate and 1 gram of benzyl dimethyl amine. The viscosity of the formulation was about 50–60 cp at 25° C.

Four-inch square, glass fabric backing-integrated mica flake dielectric was impregnated with the formulation. The sample was dried for 6 minutes at an oven temperature of 150° C. The resulting mica sample was tack-free but relatively inflexible. After about 14 days storage at 25° C it was stiff and brittle and could not be wrapped around a coil.

I claim:
1. A method of making a flexible void free mica sheet material comprising the steps of:
  a. mixing solid epoxide resin, liquid epoxide resin, ketone solvent and aromatic hydrocarbon co-solvent selected from the group consisting of benzene and arene solvents and mixtures thereof; wherein the weight ratio of solid epoxide:liquid epoxide is from about 60:40 to 95:5; the weight ratio of ketone: co-solvent is from about 70:30 to 30:70 and the weight ratio of total epoxide: total solvent is from about 85:15 to 30:70, and then
  b. mixing the epoxide — solvent mixture, with an organo-titanate catalyst selected from compounds having the structural formula $Ti(OR)_4$, wherein each R group is independently selected from the group consisting of alkyl groups having 1 to 10 carbon atoms, aryl groups, Cl, Br or $NO_2$ substituted aryl groups, alkaryl groups with the alkyl constituent having from about 1–10 carbon atoms, Cl, Br or $NO_2$ substituted alkaryl groups with the alkyl constituent having from about 1–10 carbons, aralkyl groups with the alkyl constituent having about 1–10 carbon atoms, cyclopentane groups, cyclopentene groups, cyclopentadiene groups, cyclohexane groups, cyclohexene groups, and cyclohexadiene groups, to form a homogeneous admixture,
  c. applying the homogeneous catalyzed epoxide-solvent admixture to a sheet material comprising mica, so that organo-titanate contacts mica causing organo-titanate to act as a latent catalyst,
  d. removing solvent from the epoxide-solvent admixture in the sheet material to form a flexible B staged epoxide resin containing organo-titanate as a latent catalyst contacting mica in the sheet material; wherein the amount of organo-titanate added is effective to cure the epoxide in the sheet material upon heating.

2. The method of claim 1 also including cooling the mica sheet after removing solvent, and where in step (d), at least 95 weight % of the solvent is removed by heating at a sheet material temperature of up to about 125° C.

3. The method of claim 1 wherein the ketone has from 3 to 6 total carbon atoms in the molecule and the arene solvent is selected from the group consisting of toluene, ethylbenzene, xylene and mixtures thereof; wherein, in step (b), mixing is carried out at temperatures of up to about 35° C, to form an admixture having a viscosity of between about 25 to 200 cp at 25° C, and the solvent is removed in step (d) by heating at a sheet material temperature of between about 65° to 125° C for about 1 to 10 minutes.

4. The method of claim 3, wherein the solid epoxide is selected from the group consisting of bisphenol epoxides, epoxy novolacs and mixtures thereof, the liquid epoxide is a bisphenol epoxide, about 1 to 15 parts of organo-titanate is used per 100 parts of total epoxide, and the organo titanate is selected from the group consisting of tetrabutyl titanate, tetra-2-ethylhexyl titanate, tetrabenzyl titanate, tetranaphthyl titanate, tetraphenyl titanate, tetra-2-benzylphenyl titanate, tetrachlorophenyl titanate, tetra-chlorobenzyl titanate and tetracyclopentane.

5. The method of claim 3, wherein the solid epoxide is selected from the group consisting of non-glycidyl cycloaliphatic epoxides, glycidyl ester epoxides and mixtures thereof and the liquid epoxide is selected from the group consisting of cycloaliphatic epoxides and mixtures thereof and about 0.01 to 1 part of organo-titanate is used per 100 parts total epoxide.

6. The method of claim 3, wherein the solid epoxide is selected from the group consisting of cycloaliphatic epoxides, glycidyl ester epoxides and mixtures thereof and the liquid epoxide is a bisphenol epoxide, and about 1 to 5 parts of organo-titanate is used per 100 parts total epoxide.

7. The method of claim 3, wherein the solid epoxide is selected from the group consisting of bisphenol epoxides, novolac epoxides and mixtures thereof, the liquid epoxide is selected from the group consisting of cycloaliphatic epoxides, glycidyl ester epoxides and mixtures thereof and about 1–5 parts of organo-titanate is used per 100 parts total epoxide.

8. A method of making a flexible, void free mica sheet material comprising the steps of:
  a. mixing solid epoxide resin, liquid epoxide resin, ketone solvent having from 3 to 6 carbon atoms in the molecule and an aromatic hydrocarbon co-solvent selected from the group consisting of benzene, toluene, ethylbenzene, xylene and mixtures thereof; wherein the weight ratio of solid epoxide: liquid epoxide is from about 60:40 to 95:5; the weight ratio of ketone: co-solvent is from about 70:30 to 30:70 and the weight ratio of total epoxide: total solvent is from about 85:15 to 30:70, and then
  b. mixing the epoxide-solvent mixture with an organo-titanate catalyst having the structural formula $Ti(OR)_4$, wherein R is selected from alkyl groups having from 1 to 10 carbon atoms, at a temperature up to about 35° C, to form a homogeneous admixture having a viscosity of between about 25 to 200 cp at 25° C, and then c. applying the homogeneous catalyzed epoxide-solvent admixture to a sheet material comprising mica, so that organo-titanate contacts mica causing organo-titanate to act as a latent catalyst, and then d. removing at least 95 weight % of the solvent from the epoxide-solvent admixture in the sheet material, at a sheet material temperature of up to about 125° C, to form a flexible B staged epoxide resin, containing organo-titanate as a latent catalyst contacting the mica in the sheet material; wherein the amount of organo-titanate added is effective to cure the epoxide in the sheet material upon heating at temperatures of at least about 140° C.

* * * * *